Figures 1, 2:
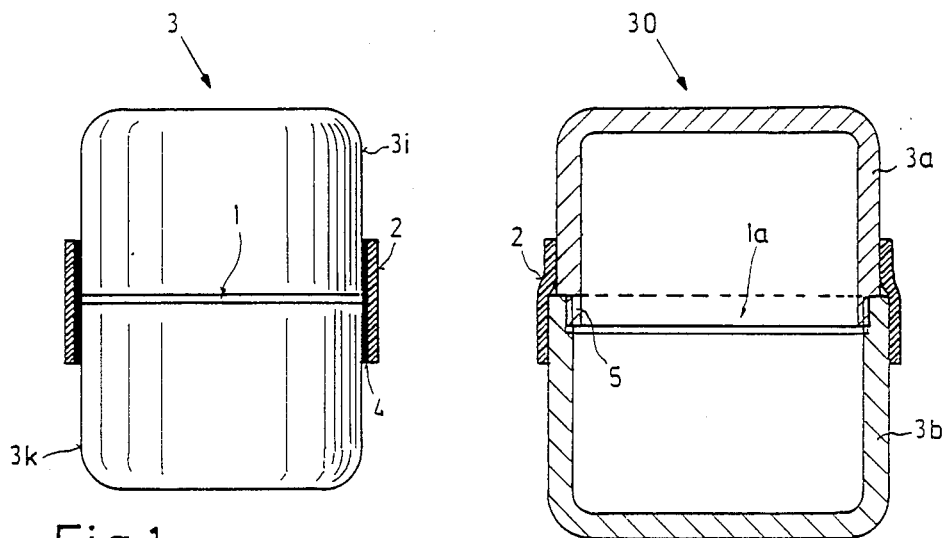

United States Patent [19]

Vadseth

[11] Patent Number: 4,862,335
[45] Date of Patent: Aug. 29, 1989

[54] CLOSURE SYSTEM FOR TWO CONTAINER PARTS

[75] Inventor: Jan E. Vadseth, Sevelen, Switzerland

[73] Assignee: Meta-Fer Holding S.A., Luxembourg-Kirchberg, Luxembourg

[21] Appl. No.: 168,904

[22] Filed: Mar. 16, 1988

[30] Foreign Application Priority Data

Mar. 16, 1987 [CH] Switzerland .......................... 976/87

[51] Int. Cl.⁴ ............................................. F21V 31/02
[52] U.S. Cl. ................................... 362/267; 362/375; 362/457
[58] Field of Search ................. 362/61, 157, 158, 457, 362/101, 154, 374, 375, 310, 267; 215/246; 340/947, 945, 953; 244/114 R; 220/4 B, 4 E, 75, 359

[56] References Cited

U.S. PATENT DOCUMENTS

| | | |
|---|---|---|
| 2,027,962 | 1/1936 | Currie . |
| 2,879,381 | 3/1959 | Coffey .................................. 362/158 |
| 2,991,899 | 7/1961 | Montalbano ........................ 220/4 B |
| 3,369,114 | 2/1968 | Carter ................................ 362/457 |
| 4,031,382 | 6/1977 | Laughter . |
| 4,118,767 | 10/1978 | Urbanek .............................. 362/267 |
| 4,290,098 | 9/1981 | Pierson ............................... 362/267 |
| 4,529,468 | 7/1985 | Bloeck et al. ....................... 220/359 |
| 4,535,395 | 8/1985 | Prestev ............................... 362/375 |
| 4,654,760 | 3/1987 | Matheson et al. .................. 362/267 |
| 4,775,076 | 10/1988 | Horvath ............................. 220/359 |

FOREIGN PATENT DOCUMENTS

| | | |
|---|---|---|
| 641694 | 5/1962 | Canada ................................. 362/61 |
| 0139483 | 5/1985 | European Pat. Off. . |
| 2414451 | 1/1978 | France ................................ 215/246 |
| 2518062 | 12/1981 | France ................................ 215/246 |

Primary Examiner—Ira S. Lazarus
Assistant Examiner—Sue Hagarman
Attorney, Agent, or Firm—Cushman, Darby & Cushman

[57] ABSTRACT

The invention relates to a closure system for two container parts to be connected to one another, for example for a lighting unit, which system can be mounted rapidly, is corrosion resistant, provides a tightness which can be monitored, and can be removed rapidly at any time and mounted again. According to the invention, the opening line (1) between the container parts is surrounded by a shrink sleeve (2) and may additionally be provided with a layer of sealing compound (4), preferably a hotmelt adhesive.

13 Claims, 2 Drawing Sheets

CLOSURE SYSTEM FOR TWO CONTAINER PARTS

The invention relates to a closure system according to the preamble of claim 1, and a lighting unit consisting of two container parts joined in this manner and a method for closing such a lighting unit. For the purposes of the invention, a closure system is understood as meaning the tight joining of two container parts of a closed container. The most frequent traditional method of joining two container parts to form a closed container is to weld these container parts to one another.

If it is desired to be able to open and close a joint or a closure, for example, the edges of the container parts are provided, along their opening line, with flanges, which are joined to one another by means of screws. O-rings are often then placed between the flanges, as a seal. Such a join is time-consuming to produce and the procedure is unpleasant, particularly in the open when exposed to wind and weather. Corrosive environmental effects frequently cause damage to the screw connection, so that the latter is difficult to separate and/or difficult to join again. Furthermore, the position of the O-ring in the screwed state cannot always be checked, with the result that it may be slightly pinched and cease to perform its sealing function.

In order to be as economical as possible with the screws, frequently screws are provided only at a few points, with the result that, when the parts are firmly screwed together, the container parts may exhibit distortions and hence leaks at these few points.

The problem of time-consuming joining and of corrosion damage to screw connections is avoided, for example, by a solution according to U.S. Pat. No. 4,031,382, in which a lighting unit is provided with a snap-on connector which is capable of joining one container part to the other via a toggle lever system and via hooks and straps. However, the other problems mentioned, in particular the tightness, are not eliminated by this solution. Moreover, the mounting of hooks and straps during production of the containers is very time-consuming and therefore expensive.

It is therefore the object of the invention to provide a closure system which can be mounted rapidly, is insensitive to corrosion, provides tightness which can be checked, can be removed rapidly at any time and can also be mounted again. This object is achieved in a satisfactory manner by the feature of claim 1.

The shrink sleeve ensures a reliable concentric (self-centering) joint between the two container parts. In particular, the tightness of the closure system according to the invention is excellent and easy to inspect visually, since the edge of the shrink sleeve can be checked at any time for openings or cavities. The lack of any openings or loose areas automatically means a tight closure. Because of their static friction against the container parts, shrink sleeves are moreover capable of transmitting axial forces to a sufficient extent.

It is true that the use of shrink sleeves has been disclosed, in quite different contexts, for the joining of two parts, as described, for example, in U.S. Pat. No. 2,027,962 and European patent application published May 2, 1985 under No. 0,139,483.

The U.S. Patent describes the covering of a tubular metal section with a shrink sleeve. This is done in order to change the surface of the tubular section in question. The European Auslegeschrift describes an electric plug connection whose cable duct is covered with a shrink sleeve to protect the cable connection inside from moisture. The two objects or solutions do not provide the skilled worker with any ideas in his search for a replacement for the welding or flange-connecting of rigid container parts exposed to weather effects.

The features of the subclaims describe advantageous embodiments of the invention.

An additional layer of sealing material increases the sealing properties of the shrink sleeve, a hotmelt adhesive being very suitable since the adhesive can be liquefied, the container heated and the shrink sleeve shrunk in one operation.

Where the two container parts have to meet particularly high strength requirements in the axial direction (for the purposes of the present invention, "axial" is always understood as being "essentially at right angles to the area formed by the opening line"), the possible embodiments according to claim 3 are provided, since the shrink sleeve also engages the collar-like projection and thus holds the two container parts more tightly together than would be possible only with flat container parts, where the binding force is provided solely by the static friction of the shrink sleeve. The collar-like projection may also have mutually overlapping elements, so that, for example, one projection can be inserted into the other, furthermore resulting in an additional concentric guide for the two container parts with respect to one another.

In the variant according to claim 4, the shrink sleeve performs virtually only a sealing function, as well as protecting the opening line or the elements provided there (screw thread, catches, etc.) from the surroundings, with the result that outstanding corrosion protection is ensured.

The features of claim 5 increase on the one hand the static friction of the shrink sleeve in the axial direction and on the other hand the sealing function of the said sleeve, since zones of increased contact pressure occur at the edges of the ribs or grooves.

The shrink sleeve may consist of a very wide range of materials, elastomers, such as rubber, etc., being used most frequently. However, there is a large number of very different plastics which have shrinkage properties; for the purposes of the present invention, shrinkage is not exclusively thermal shrinkage.

The features of claim 6 provide a further improvement of the closure system and better adhesion of the shrink sleeve to container parts which have grooves or ribs, or collar-like or other projections. When these are connected by a shrink sleeve which also exhibits longitudinal shrinkage, the transmission of force in the axial direction is increased, and the container walls are pressed firmly together.

In an experimental example, it was found, for example, that, in a container of about 20 cm diameter and consisting of two container parts which have a collar of about 4 mm along their opening line, an internal pressure of more than 5 atmospheres gage pressure can be generated without the two container parts being forced apart and without the container developing leaks. In this arrangement, the shrink sleeve has a width of about 9 cm and a thickness of about 4 mm and consists of a prestretched heat-shrinkable rubber material.

A closure system according to the invention is used in particular in open-air lighting engineering, since lighting units mounted in the open have to date been tightly closed only under very difficult and expensive conditions.

If it proves impossible to provide such a lighting unit with a tight seal, the following disadvantages may result: condensation of water on the light outlets (reduces amount of light emitted); condensation of water on electrical connections (leads to leakage current losses, corrosion, short-circuit, failure of lighting unit); condensation of water in joints and gaps in the lighting unit (leads to frost cracks and destruction of the lighting unit at temperatures below zero degrees); dust penetration (reduces the light efficiency), etc.

By means of the sealing properties of the closure system, it is now possible, and intended according to the invention, to reduce the gas pressure inside the container, with the result that the said pressure does not impose an excessive load on the entire structure of the lighting unit when the latter is considerably heated and the vapor pressure inside thus increased. Conversely, when the pressure inside the lighting unit is lower than atmospheric pressure, the shrink sleeve is to a certain extent sucked against the opening line, providing greater tightness. If, in addition, the humidity is reduced, water condensation is stopped down to temperatures below zero degrees.

The dryness inside the lighting unit is further improved according to the defining clause of claim 7, the fact that the hygrophilic substance is visible providing an indication of the tightness of the lighting unit. Hygrophilic substances are usually salts or silica gel, which changes color after absorbing moisture. Thus, if a color change occurs, which can be observed, for example, by looking into the light orifice or another orifice provided for this purpose, it may be assumed that the container of the lighting unit has developed a leak and water has penetrated. For special applications, it would even be possible to provide a special inspection window to permit this inspection.

The method defined in claim 9 for closing a lighting unit ensures that, on the one hand, the pressure inside the lighting unit is lower compared with the outside pressure, and, on the other hand, the moisture has escaped from the lighting unit; this furthermore permits very rapid and reliable assembly of a dismantled lighting unit. Heating of a lighting unit can be effected, for example, in such a way that the lighting unit is mounted on a rotatable turntable and heated on one side with a flame from a stationary gas burner or the like. By rotating the lighting unit on the turntable, the said unit warms up uniformly. Thereafter, the shrink sleeve can be very simply pushed over using the hotmelt adhesive which has already been applied. Further rotation and application of the flame ensures optimum symmetrical shrinkage of the shrink sleeve and hence an outstanding tight closure according to the invention.

The invention is illustrated by Examples and with reference to the drawings.

Figure 5:
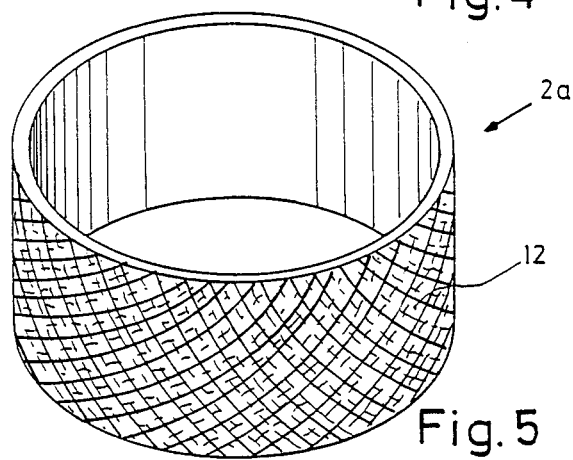
Figure 6:
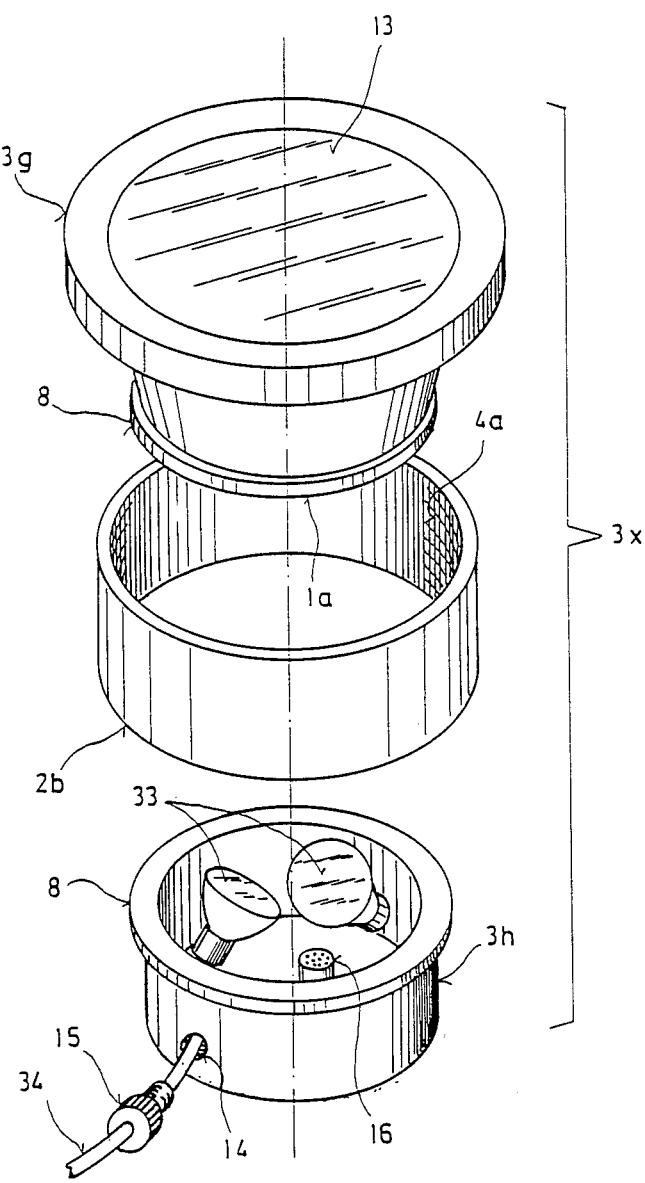

FIGS. 1-4 show simple bomb-shaped containers, each having a different opening line, FIG. 5 shows a structured shrink sleeve and FIG. 6 shows a lighting unit shortly before assembly.

In FIG. 1, a rigid closed container 3 is composed of two rigid container parts 3$i$ and 3$k$. The two container parts 3$i$ and 3$k$ are placed against one another along an opening line 1 and firmly connected to one another, or provided with a tight seal, by means of shrink sleeve 2, which surrounds the opening line 1. A sealing material 4 consisting of hotmelt adhesive, silicone rubber or the like is applied between the container 3 or its opening line 1 and the shrink sleeve 2.

The container 3 could be provided, for example, for the storage of articles—with exclusion of moisture harmful to these articles.

FIG. 2 shows a similar container 30 which, however, is screwed together through a thread 5 in the two container parts 3$a$ and 3$b$, in addition to the connection by means of shrink sleeve 2 at an opening line 1$a$. The container part 3$b$ carries an internal thread which can be screwed onto an external thread of the container part 3$a$. Instead of this embodiment, it would also be possible, for example, for each of the parts 3$a$ and 3$b$ to be provided with an external thread having the same diameter, which external thread could be screwed together with a nut.

Figures 3, 4:
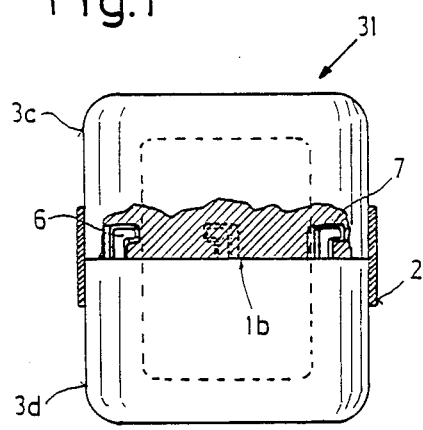

FIG. 3 shows a similar container 31 whose container parts 3$c$ and 3$d$ are likewise placed together at an opening line 1$b$, the container part 3$d$ having bayonet-like catches 6 which are inserted into diametrically opposite closing orifices 7 in the container part 3$c$. In this case too, the shrink hose surrounds the opening line 1$b$. This embodiment permits very rapid joining of container parts 3$c$ and 3$d$, and it is also possible for great forces to be absorbed in the axial direction without separating the two container parts 3$c$ and 3$d$.

FIG. 4 shows a further container 32 which consists of two container parts 3$e$ and 3$f$ which are placed together at an opening line 1$c$. The container parts 3$e$ and 3$f$ have a collar-like projection 8 at the opening line 1$c$, followed by grooves 9 and ribs 10 oriented in the peripheral direction. The shrink sleeve 2 overlaps the entire region of the grooves 9, ribs 10, projections 8 and opening line 1$c$. The projections 8 permit good transmission of the shrinkage forces even in the axial direction of container 32. The tightness is further reinforced by the grooves 9 and the ribs 10, and these ribs and grooves are also capable of transmitting greater axial forces.

FIG. 5 shows an annular shrink sleeve 2$a$ which has structural elements 12. These structural elements 12 are only shown schematically and may be, for example, a network of filaments which, particularly in their longitudinal dimension, are capable of applying shrinkage forces. The structural elements 12 can, however, also be cables or the like or merely molecular structures. In FIG. 5, these structural elements are arranged somewhat obliquely with respect to the axial direction of the shrink ring 2$a$. Consequently, the shrink ring 2$a$ shrinks both in the radial and in the axial direction. This is optimal, for example, for producing a join in a container 32 according to FIG. 4.

FIG. 6 shows a container 3$x$ in the unassembled state, the said container essentially consisting of a container part 3$g$ and container part 3$h$. Two lamps 33 are arranged in the container part 3$h$. The container part 3$g$ is conically tapered toward its opening line 1$a$. Along the opening line 1$a$, the container part 3$g$ has a collar-like projection 8 which can be made to engage a diametrically opposite projection 8 on the container part 3$h$. Container part 3$g$ and container part 3$h$ are connected by means of shrink sleeve 2$b$, which is coated on its inside with a hotmelt adhesive 4$a$. The container part 3$g$ has, at its upper end, a light orifice 13, through which the light from lamps 33 can pass into the open. The light orifice is covered with a translucent or transparent glass or plastic cover, which is not shown. A lighting unit of this type, or container 3$x$, can be used for street lights, swimming pool lights or airfield lights, etc. and is distinguished by outstanding tightness and rapid assembly. The power supply is via a cable 34 and a cable duct 15, which is in the form of a T nut and can be screwed tightly into an orifice 14 of the container part 3h. Inside, the container part 3h also contains a strongly hygrophilic substance 16. On the one hand, this keeps the air inside the container 3x dry while on the other hand it is possible to inspect the hygrophilic substance visually through the light orifice 13 and to determine whether or not it has changed color due to the action of moisture. A very discolored hygrophilic substance 16 would indicate that the closure system had developed a leak.

The invention is in no way restricted by the Figures shown. A closure system according to the invention can also be provided in a very simple manner for angular containers or containers of other shapes, or container parts.

It would also be possible to provide an additional O-ring as a seal on the end face of the opening line and/or to design the walls of the container parts to overlap one another.

What is claimed is:

1. A casing for an air field light comprising a rigid container consisting substantially of first and second parts, each said part having a flange portion, said flange portions being connected to one another so as to seal the container; and
    a shrink sleeve surrounding said flange portions and providing a water-tight seal of said first and second parts.

2. A casing as claimed in claim 1, further including a layer of sealing material disposed between the container and the shrink sleeve.

3. A casing as claimed in claim 2, wherein the layer of sealing material is a hot melt adhesive.

4. A casing as claimed in claim 1, wherein at least one collar-like projection having a closed annular configuration is defined along an opening line of at least one of said flange portions of said first and second parts.

5. A casing as claimed in claim 1, wherein said flange portions have screwthreads defined thereon.

6. A casing as claimed in claim 1, wherein said flange portions have at least three bayonet-like catches mounted thereto and corresponding closing orifices.

7. A casing as claimed in claim 1, wherein at least one of grooves and ribs are defined adjacent and substantially parallel to said flange portions on a surface of at least one of said container parts.

8. A casing as claimed in claim 1, wherein said shrink sleeve has longitudinally shrinking structural elements which are arranged at least partially in the axial direction of the shrink sleeve or inclined with respect to that direction.

9. A casing as claimed in claim 1, wherein a gas pressure within said container is reduced relative to an external atmospheric pressure.

10. A casing as claimed in claim 1, wherein a relative humidity within said container at room temperature is reduced relative to atmospheric conditions.

11. A casing as claimed in claim 1, wherein at least one of an orifice and a window is defined in at least one of said container parts and a strongly hydrophilic substance which changes color upon absorption of humidity is disposed within said container so as to be visible through said at least one orifice or window.

12. A method for closing a casing for an air field light comprising a rigid container consisting substantially of first and second parts, each said part having a flange portion, said flange portions being connected to one another so as to seal the container, and a shrink sleeve surrounding said flange portions and providing a water-tight seal of said first and second parts, wherein a gas pressure within said container is reduced relative to an external atmospheric pressure, comprising:
    placing said container parts together along the flanges, while leaving open an orifice being defined in one of said container parts for receiving a cable duct;
    heating the container to at least 50° C.;
    surrounding the container in the region of an opening line defined between said flanges with a heat-shrinkable shrink sleeve;
    heating at least said heat shrinkable sleeve to its shrinking temperature; and
    closing said orifice.

13. A method as claimed in claim 12, further comprising the step of coaxing an interior surface of said heat shrinkable sleeve with a hot melt adhesive prior to mounting said sleeve to said container parts.

* * * * *